June 3, 1958  R. L. PLOUFFE, JR  2,837,737
RADAR SWEEP MULTIPLIER
Filed Dec. 17, 1953

INVENTOR
ROBERT L. PLOUFFE, JR.

BY

ATTORNEYS

United States Patent Office 2,837,737
Patented June 3, 1958

2,837,737

RADAR SWEEP MULTIPLIER

Robert L. Plouffe, Jr., Livingston, N. J., assignor, by mesne assignments, to the United States of America as represented by the Secretary of the Navy Application December 17, 1953, Serial No. 398,902

7 Claims. (Cl. 343—13)

This invention relates to a system for presenting short range information on a long sweep in cases where a short sweep cannot be presented on a radar indicator.

Ordinarily, it is necessary to have a correspondence between time and range of 12.3 microseconds per nautical mile for the sweeps of a radar indicator. This invention eliminates the necessity for this correspondence when using radar for sonobuoy or beacon plotting.

Assuming the direct voltage output representative of a range gating system to be equal to V volts per nautical mile, the indicator sweep in present systems would be required to be V volts per 12.3 microseconds. By means of the present system, the indicator sweep may be varied from this correspondence to any value of V/N volts per 12.3 microseconds, thereby providing a correspondence between distance and time of any value of N times 12.3 microseconds per nautical mile. The advantage is that a slow sweep can be used to present short range information with the same resulting presentation as if a fast sweep were used. It is well known that slow sweeps can be obtained with better linearity and with smaller power than is practicably feasible with fast sweeps.

It is an object of this invention, therefore, to provide a system wherein a direct voltage signal having a given correspondence between time and distance of volts per mile (12.3 microseconds) is employed to control a cut-off delay tube, and wherein a sawtooth voltage having a slope of V volts/N per 12.3 microseconds is applied to said cutoff tube and to an indicator to produce a delayed video pulse for the indicator having a correspondence between time and distance of N times 12.3 microseconds per mile.

Figure 1:
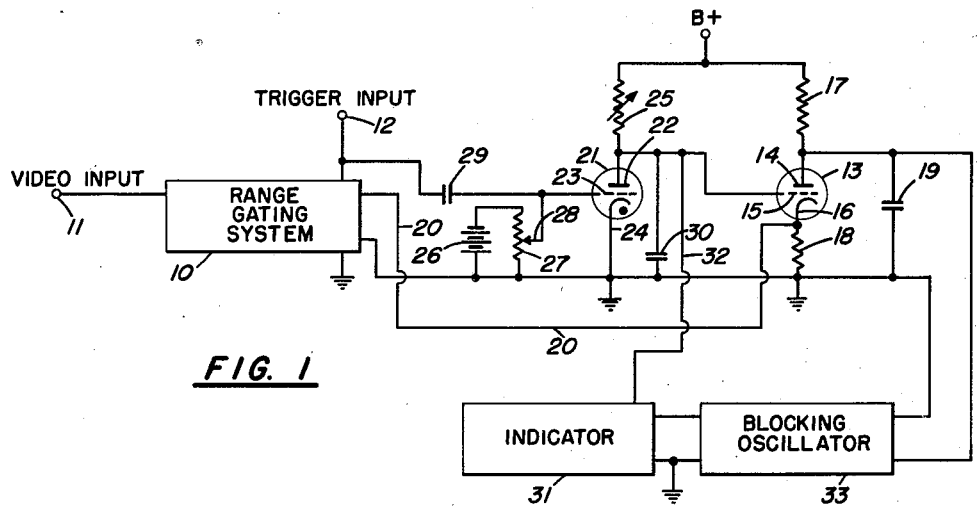

Further objects and advantages of this invention will become apparent upon consideration of the following detailed description and the appended claims taken in connection with the accompanying drawing in which:

Fig. 1 is a schematic circuit diagram, partly in block form of a preferred embodiment of this invention; and Figs. 2a, 2b, 2c and 2d are curves illustrating the operation of the system.

Referring to Fig. 1 of the drawing, the range gating system 10 of a radar range finding apparatus is shown in block diagram form. The video input signal representative of the range to a target, sonobuoy or beacon is applied to the range gating system at the input terminal 11, while a trigger input, or sync signal, is applied at the terminal 12 in the conventional manner.

The system also comprises a cutoff triode delay tube 13 having a plate 14, a grid 15 and a cathode 16. The plate 14 is connected to a B+ supply through a plate resistor 17, and the cathode 16 is connected to ground through a cathode biasing resistor 18. With no signal applied to the grid or cathode of the triode 13, the tube is cut off, and the condenser 19, which is connected between the plate 14 and ground, is charged to a maximum value. The direct voltage signal, or control voltage, which is produced by the range gating system 10 is applied through the lead line 20 to the cathode biasing resistor 18 to drive the cathode positive by an amount equal to the control voltage and thereby driving the triode 13 below cutoff by said amount.

The system also includes a sawtooth voltage generator which may comprise a thyratron 21 having a plate 22, a grid 23 and a grounded cathode 24. The plate 22 is connected to the B+ supply through a variable resistor 25, while the grid 23 is negatively biased by means of the parallel connected battery 26 and resistor 27 through a movable tap 28. The trigger, or sync, signal is applied to the grid 23 through a condenser 29. A charging and discharging condenser 30 is connected across the thyratron 21 and the voltage thereacross is applied to the grid 15 of the cutoff triode 13 and to the sweep circuit of a radar indicator 31 through a lead line 32. The voltage appearing across the condenser 19 is applied to a conventional blocking oscillator 33 for producing a video pulse which is coupled from the blocking oscillator to the indicator 31.

For an understanding of the operation of the system described, reference should now be made to the curves of Fig. 2. Assuming the output of the range gating system to be equal to V volts per 12.3 microseconds (or one nautical mile), the curve of Fig. 2a is representative of the sweep employed in a prior art system wherein the correspondence between time and distance of 12.3 microseconds per nautical mile for the sweeps on the radar indicator is maintained. The dotted horizontal line in the curve of Figure 2a represents the voltage impressed on the cathode 16 of the triode 13 and is of the amount by which the triode 13 has been biased below cutoff in response to a given range signal. It is seen that when the condenser 30 of the sawtooth generator charges to a value equal to the range signal, the triode 13 will conduct, and, as shown in Fig. 2c, the condenser 19 will discharge to provide a video signal at time $t_1$.

Figure 2A:
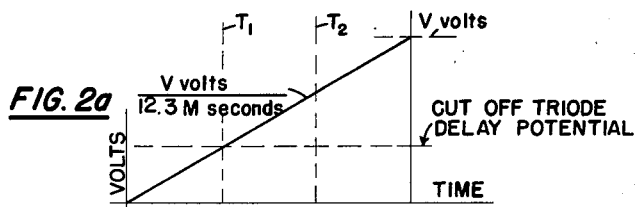
Figure 2B:
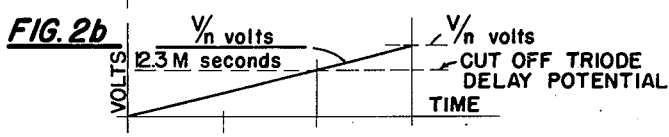
Figure 2C:
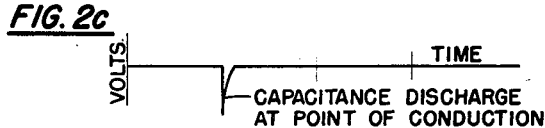
Figure 2D:
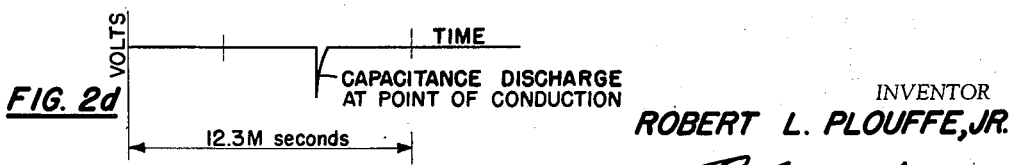

In Fig. 2b a curve is shown representing a sweep wherein the correspondence between time and distance of 12.3 microseconds per nautical mile for the sweep of the indicator is not maintained. In fact, the sweep is made V/N volts per 12.3 microseconds. With the same range voltage impressed on the cathode 16, it is seen that the output of the sawtooth generator will not equal the range signal until time $t_2$ when the condenser 19 discharges, as shown in Fig. 2d. Thus, it is seen that where the output of the sawtooth generator is V/N volts per 12.3 microseconds, when the range voltage is V volts per 12.3 microseconds, the pulse from the blocking oscillator will be delayed from the trigger or sync input N times as far as the video pulse, and where the linear sawtooth is used to provide sweeps for the indicator, the result obtained is to provide a correspondence between distance and time of N times 12.3 microseconds per nautical mile.

While only one preferred embodiment of this invention has been described, it appears obvious that many modifications will become readily apparent to those skilled in the art. It is the intent, therefore, that this invention cover all such modifications and that it be limited only by the prior art and the spirit and scope of the appended claims.

I claim:

1. A radar sweep multiplier comprising: an electronic switch biased at the point of cutoff and connected across a source of potential; a condenser connected across said electron switch; a range gating system having a direct voltage output proportional to range coupled to said electron switch for biasing said switch below cutoff; and a sawtooth generator having an output coupled to said switch for driving said switch above cutoff, whereby said condenser discharges when said electron switch conducts.

2. The invention as defined in claim 1 wherein said electron switch is an electric space discharge device having a plate, a cathode and a grid, and wherein said direct voltage signal is coupled to said cathode, and wherein the output of said sawtooth generator is coupled to said grid.

3. The invention as defined in claim 1 wherein means are proved for adjusting the slope of the output of said sawtooth generator.

4. The invention as defined in claim 3 wherein said electron switch is an electric space discharge device having a plate, a cathode and a grid, and wherein said direct voltage signal is coupled to said cathode, and wherein the output of said sawtooth generator is coupled to said grid.

5. A radar sweep length multiplier comprising: a range gating system for producing a direct voltage output signal proportional to range; a linear sawtooth voltage generator; means for varying the slope of the output of said generator; a delay circuit comprising a space discharge device biased at the point of cutoff and having a plate connected to a source of power, a cathode grounded through a cathode biasing resistor, and a grid; a condenser connected across said space discharge device; a radar indicator having a sweep input circuit coupled to the output of said sawtooth voltage generator, and having a video input circuit; a blocking oscillator having an input circuit connected across said condenser and having an output coupled to said video input circuit of said radar indicator; means coupling said output signal proportional to range to said cathode for biasing said space discharge device below cutoff; and means coupling the output of said sawtooth generator to said grid for driving said space discharge device above cutoff, whereby said space discharge device conducts and said condenser discharges, thereby producing a pulse for triggering said blocking oscillator and producing a video pulse on said radar indicator.

6. A radar system comprising range means for producing an output D. C. voltage having a magnitude which is a function of target range, sawtooth means for producing an output sawtooth voltage of selectively determinable slope, an indicator, leads for conducting the output of said sawtooth means to provide a sweep voltage for said indicator, electronic switching means under control of said output D. C. voltage and said output sawtooth voltage for providing a low resistance path when said sawtooth voltage is equal to or greater in amplitude than said D. C. voltage, charge storage means connected in parallel with said switching means, video pulse forming means connected to be triggered by said charge storage means, and circuit means connecting the output of said pulse forming means to said indicator.

7. A radar receiving system comprising a first input terminal for receiving a trigger pulse simultaneous with the transmission of a radar pulse from a radar transmitter, a second input terminal for receiving a radar echo pulse, range means connected to said first and second terminals for producing a D. C. output voltage the magnitude of which is a function of the time difference between the reception of pulses from said first and second terminals, sawtooth means for producing an output sawtooth voltage of selectively determinable shape, leads connecting said first input terminal to said sawtooth means whereby the operation of said sawtooth means is initiated upon reception of a trigger pulse, an indicator having a sweep circuit connected to be energized by said output sawtooth voltage, a switching circuit connected to be energized by said D. C. output voltage and said output sawtooth voltage for producing a low resistance path only when said sawtooth voltage is equal to or greater in magnitude than said D. C. output voltage, charge storage means connected to be discharged by said switching means when a low resistance path is produced, pulse producing means connected to produce a pulse upon discharge of said charge storage means, and leads connecting the output of said pulse producing means to the input of said indicator.

References Cited in the file of this patent

UNITED STATES PATENTS

| | | |
|---|---|---|
| 2,422,696 | Meacham | June 24, 1947 |
| 2,428,038 | Rothbait | Sept. 30, 1947 |
| 2,429,623 | Hoisington | Oct. 28, 1947 |
| 2,597,353 | MacNichol | May 20, 1952 |
| 2,698,933 | Moore | Jan. 4, 1955 |
| 2,728,900 | Ross | Dec. 27, 1955 |